United States Patent
Cai et al.

(10) Patent No.: US 8,279,793 B2
(45) Date of Patent: Oct. 2, 2012

(54) MULTI-STAGE SETUP FOR LONG-TERM EVOLUTION MULTIMEDIA BROADCAST MULTICAST SERVICE TRANSMISSIONS

(75) Inventors: Zhijun Cai, Euless, TX (US); James Earl Womack, Bedford, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/349,446

(22) Filed: Jan. 12, 2012

(65) Prior Publication Data

US 2012/0113885 A1 May 10, 2012

Related U.S. Application Data

(63) Continuation of application No. 11/741,362, filed on Apr. 27, 2007, now Pat. No. 8,130,687.

(51) Int. Cl.
*H04H 20/71* (2008.01)
*H04B 7/212* (2006.01)
*H04L 12/56* (2006.01)
*H04W 4/00* (2009.01)

(52) U.S. Cl. ...... 370/312; 370/394; 370/444; 455/422.1
(58) Field of Classification Search ............... 455/422.1, 455/444; 370/315, 312, 390
See application file for complete search history.

(56) References Cited

U.S. PATENT DOCUMENTS

| | | |
|---|---|---|
| 2003/0043786 A1 | 3/2003 | Kall et al. |
| 2004/0223513 A1 | 11/2004 | Meago |
| 2005/0232292 A1 | 10/2005 | Richards et al. |
| 2006/0094408 A1 | 5/2006 | Hu et al. |
| 2006/0106865 A1 | 5/2006 | Beming et al. |
| 2006/0203756 A1 | 9/2006 | Hu |
| 2006/0205418 A1* | 9/2006 | Diana et al. .......... 455/458 |
| 2006/0252439 A1 | 11/2006 | Cai |
| 2008/0031245 A1 | 2/2008 | Pekonen |
| 2009/0022080 A1* | 1/2009 | Edlund et al. .......... 370/315 |

FOREIGN PATENT DOCUMENTS

| | | |
|---|---|---|
| EP | 1475984 A1 | 11/2004 |
| EP | 1729535 A1 | 12/2006 |
| WO | 2006073338 A1 | 7/2006 |

OTHER PUBLICATIONS

Bakaimis, Byron Alex, "A New Scheme for Synergy among cellular and broadcast networks", Computer as a Tool, EUROCON 2005, pp. 1791-1794, v 2, Nov. 2005.*

(Continued)

*Primary Examiner* — Jinsong Hu
*Assistant Examiner* — Opiribo Georgewill
(74) *Attorney, Agent, or Firm* — Conley Rose, P.C.; J. Robert Brown, Jr.

(57) ABSTRACT

A system for providing a service is provided. The system includes a central control to promote a plurality of cells to use a first counting method to determine whether user equipment within the plurality of cells are interested in the service. Based on responses from at least one of the cells having interested user equipment, the central control promotes the at least one of the cells to either provide the service via point-to-multipoint broadcast, or use a second counting method to determine whether to provide the service via point-to-multipoint broadcast or point-to-point communication.

9 Claims, 5 Drawing Sheets

OTHER PUBLICATIONS

Cai, Zhijun, et al.; U.S. Appl. No. 11/741,362, filed Apr. 27, 2007; Title: "Multi-Stage Setup for Long-Term Evolution Multimieda Broadcast Multicast Service Transmissions".

Cai, Zhijun; U.S. Appl. No. 11/737,977; Title: "Polling Method and Apparatus for Long Term Evolution Multimedia Broadcast Multicast Services"; filed Apr. 20, 2007.

Cai, Zhijun; U.S. Appl. No. 11/767,019; Title: "Location of Packet Data Convergenece Protocol in a Long-Term Evolution Multimedia Broadcast Multicast Service"; filed Jun. 22, 2007.

3GPP TS 25.346 V6.7.0; 3rd Generation Partnership Project; Technical Specification Group Radio Access Network; Introduction of the Multimedia Broadcast Multicast Service (MBMS) in the Radio Access Network (RAN); Release 6; Dec. 2005; 59 pgs.

3GPP TR 25.813 V7.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Interface Protocol Aspects; Release 7; Sep. 2006; 41 pgs.

3GPP TR 25.814 V7.1.0; 3rd Generation Partnership Project; Technical Specification Group Radio Access Network; Physical Layer Aspects for Evolved Universal Terrestrial Radio Access (UTRA); Release 7; Sep. 2006; 132 pgs.

RAN2#54; "Layer 1 Signalling Based User Detection for LTE MBMS;" R2-062271; Tallinn, Estonia; Aug. 28-Sep. 1, 2006; 5 pages.

Annamalai, Magesh; "Multimedia Broadcast Multicast Service (MBMS) in GSM Based Wireless Networks;" T-Mobile USA; 24 pages, Sep. 2006.

Office Action dated Feb. 2, 2010; U.S. Appl. No. 11/741,362, filed Apr. 27, 2007; 53 pages.

Final Office Action dated Jul. 21, 2010; U.S. Appl. No. 11/741,362, filed Apr. 27, 2007; 18 pages.

Notice of Allowance dated Dec. 6, 2011; U.S. Appl. No. 11/741,362, filed Apr. 27, 2007; 17 pages.

European Extended Search Report; Application No. 07109018.7; Sep. 17, 2007; 9 pages.

European Examination Report; Application No. 07109018.7; May 7, 2009; 5 pages.

European Examination Report; Application No. 07109018.7; Feb. 24, 2010; 6 pages.

PCT International Search Report; Application No. PCT/CA2008/000761; Aug. 6, 2008; 3 pages.

PCT Written Opinion of the International Searching Authority; Application No. PCT/CA2008/000761; Aug. 6, 2008; 5 pages.

PCT International Preliminary Report on Patentability; Application No. PCT/CA2008/000761; Oct. 27, 2009; 7 pages.

European Extended Search Report; Application No. 11166414.0; Aug. 17, 2011; 7 pages.

* cited by examiner

MULTI-STAGE SETUP FOR LONG-TERM EVOLUTION MULTIMEDIA BROADCAST MULTICAST SERVICE TRANSMISSIONS

CROSS-REFERENCE TO RELATED APPLICATIONS

This application is a continuation which claims benefit of and priority to U.S. patent application Ser. No. 11/741,362 filed Apr. 27, 2007, by Zhijun Cai, et al. entitled "Multi-Stage Setup for Long-Term Evolution Multimedia Broadcast Multicast Service Transmissions," which is incorporated by reference herein as if reproduced in its entirety.

BACKGROUND

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. Devices that might be used by users in a telecommunications network can include both mobile terminals, such as mobile telephones, personal digital assistants, handheld computers, portable computers, laptop computers, tablet computers and similar devices, and fixed terminals, such as residential gateways, televisions, set-top boxes, and the like. Such mobile and fixed devices will be referred to herein as user equipment or UE.

A group of LTE-based cells might be under the control of a single entity known as a central control. The central control typically manages and coordinates certain activities with a group of cells such as scheduling the transmission of services from the ENBs under its control to the UEs being served by the ENBs.

Services that might be provided by LTE-based equipment can include broadcasts or multicasts of television programs, streaming video, streaming audio, and other multimedia content. Such services are commonly referred to as multimedia broadcast multicast services (MBMS). The term "MBMS" will be used herein to refer to any service provided by LTE-based equipment. An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

An MBMS may be communicated from an ENB to a UE using point-to-point (PTP) communication or point-to-multipoint (PTM) communication. PTP communication is similar to conventional cellular network communication in that there is a dedicated radio bearer between the ENB and a UE. PTP communication from the ENB may enable high quality communication with the UE. However, when an ENB communicates with a large number of UEs using PTP communication, a substantial amount of overhead may be required for establishing and maintaining the PTP communications and a substantial amount of the available spectrum may be occupied.

PTM communication may include utilizing a dedicated channel or dedicated carrier to broadcast data or services to multiple UEs. While a certain amount of overhead may be required to initiate a broadcast PTM communication, the overhead is relatively small and may not vary in relation to the number of UEs. That is, as more UEs utilize the broadcast data or services, the overhead required to establish and maintain the broadcast PTM communication remains approximately the same. Broadcast PTM communications may also improve spectral efficiency as the number of UEs increases because no new transmissions are required for newly added users. In some cases, the quality of broadcast PTM communications may be less than that for PTP communications since there is little or no communication from the UEs to the ENB, and because of power considerations and other factors that may reduce the relative quality of the communication.

When multiple cells overlap, a UE within the overlapped region can receive transmissions from multiple ENBs. It is well known in the art that when a UE receives substantially identical data from a plurality of ENBs, the transmissions from the ENBs can augment one another to provide a signal of significantly higher quality than would be the case if only one ENB were transmitting the signal. That is, a higher signal-to-noise ratio can be achieved when substantially the same data is transmitted at substantially the same time on substantially the same resource with substantially the same modulation and coding. A region in which a plurality of substantially identical signals are present is known as a single frequency network, or SFN. In the case where all of the ENBs in a service area are transmitting an MBMS with substantially identical signals, the service area would be an SFN. However, if the ENBs were transmitting the MBMS with different signals, for example, on a different resource, the service area would not be an SFN.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. This application is related to U.S. patent application Ser. No. 11/737,977, filed on Apr. 20, 2007, inventor Zhijun Cai, entitled "Polling Method and Apparatus for Long Term Evolution Multimedia Broadcast Multicast Services," which is incorporated herein by reference for all purposes.

In an embodiment, a system for providing a service is provided. The system includes a central control to promote a plurality of cells to use a first counting method to determine whether user equipment within the plurality of cells are interested in the service. Based on responses from at least one of the cells having interested user equipment, the central control promotes the at least one of the cells to either provide the service via point-to-multipoint broadcast, or use a second counting method to determine whether to provide the service via point-to-multipoint broadcast or point-to-point communication.

In another embodiment, a method for determining a type of communication for a service is provided. The method includes determining, by a number of cells using a first counting method, the number of cells that contain at least one user equipment interested in the service. The method includes when the number of cells that contain at least one user equipment interested in the service is above a first threshold, transmitting the service via point-to-multipoint communication. When the number of cells that contain at least one user equipment interested in the service is below the first threshold, using a second counting method to count the number of user equipment interested in the service in each of the cells that contain at least one user equipment interested in the service. Based on the second counting method, when the number of user equipment interested in the service in one of the cells that contain at least one user equipment interested in the service is below a second threshold, transmitting the service in the one of the cells via point-to-point communication. When the number of user equipment interested in the service in one of the cells that contain at least one user equipment interested in the service is above the second threshold, transmitting the service in the one of the cells via point-to-multipoint communication.

Figure 1:
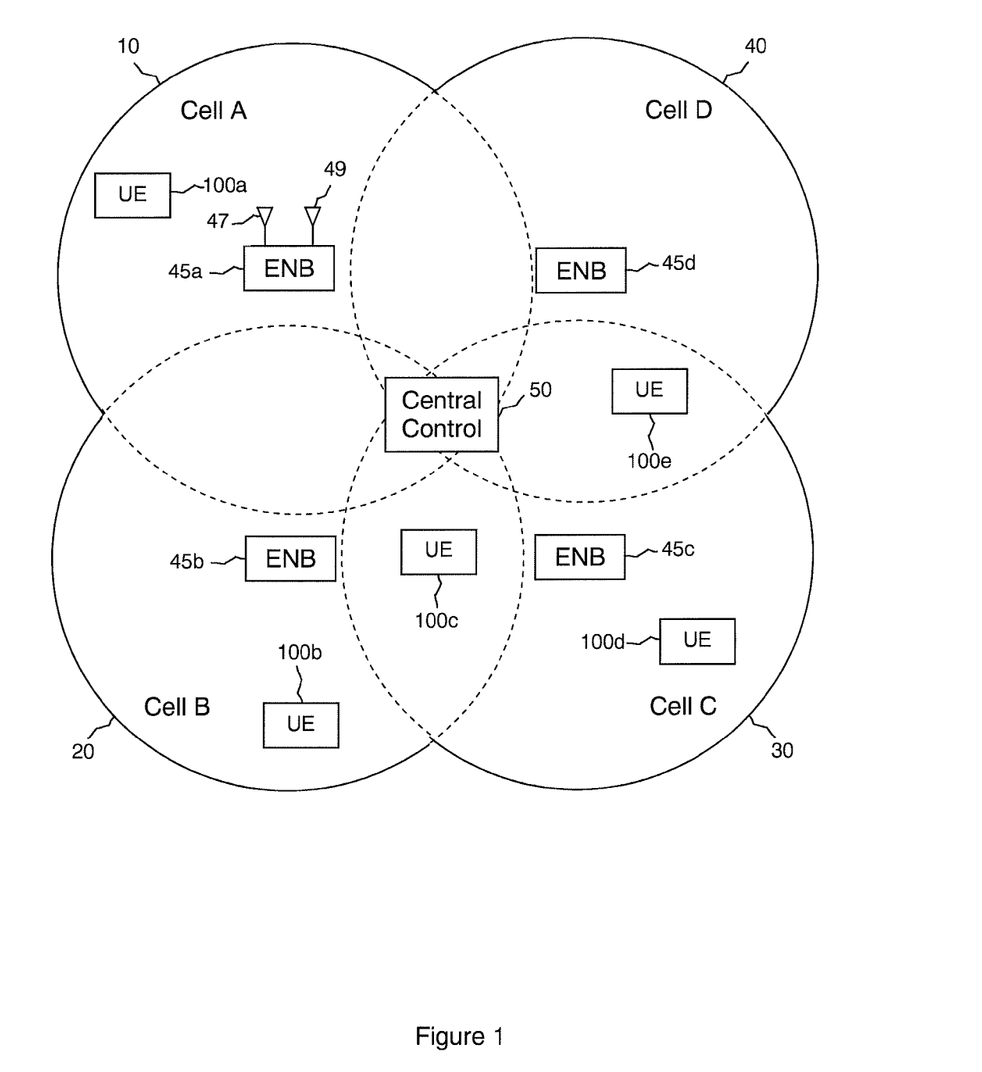
FIG. 1 is an illustration of a group of cells according to an embodiment of the disclosure.

FIG. 1 illustrates a geographic region covered by a plurality of cells. One or more UEs are present in each of the cells. UE 100a is in a region covered only by Cell A 10. Cell B 20 contains a UE 100b that is not covered by any other cell and a UE 100c that is also covered by cell C 30. Cell C 30 contains a UE 100d that is not covered by any other cell, and a UE 100e that is also covered by cell D 40. An ENB 45 in each of the cells 10, 20, 30, and 40 performs functions similar to those of a traditional base station. That is, the ENBs 45 provide a radio link between the UEs 100 and other components in a telecommunications network. A central control 50 or central controller oversees the wireless data transmissions within the cells 10, 20, 30, and 40 by providing centralized management and coordination for the cells 10, 20, 30, and 40 and their corresponding ENBs 45. It should be recognized that numerous other arrangements of these components are possible. For example, a different number of cells could be managed by the central control 50, the cells could be of different sizes and could overlap in different ways, a different number of UEs could be present in different locations within the cells, radio links other than the ENBs 45 could be used, and so on.

Each of the cells 10, 20, 30, and 40 might be transmitting one or more MBMS services throughout its region of coverage. In the present disclosure, the cellular systems or cells are described as engaged in certain activities, such as transmitting signals; however, as will be readily apparent to one skilled in the art, these activities would in fact be conducted by components comprising the cells such as, for example, the ENB 45 at each cell location promoting communication, such as ENB 45a communicating via transmitter 47 and receiver 49 and/or other well known equipment.

Typically, the performance gain from using PTP communication may diminish when the number of UEs 100 increases. Therefore, when a large number of UEs 100 in one of the cells 10, 20, 30, or 40 want to utilize an MBMS, it may become more efficient and improve the quality of the MBMS for one or more of the cells 10, 20, 30, or 40 to use a broadcast PTM communication rather than PTP communication. For example, upon cell C 30 determining that the number of UEs 100 interested in an MBMS is large, cell C 30 may decide to communicate the MBMS through a broadcast PTM communication. Traditionally, complex counting algorithms, such as those defined in the universal mobile telecommunications system (UMTS) release 6 (R6), have been implemented at the cells 10, 20, 30, or 40 to determine how many UEs 100 are currently using an MBMS and/or how many UEs 100 are interested in using an MBMS. Implementing these counting algorithms increases the communication overhead as well as the load on uplink access channels in the cells 10, 20, 30, or 40.

In an embodiment, a multi-stage setup process is followed to determine the type of communication that will be used in a plurality of cells. In a first stage, a streamlined counting procedure is followed to determine the number of cells that have UEs 100 that are interested in receiving an MBMS. When this number is relatively high, PTM communication can be used in the cells. When this number is relatively low, a second stage may be entered wherein a traditional, more detailed counting procedure is followed to determine a more accurate count of the number of UEs 100 that are interested in receiving the MBMS. The results of the detailed counting procedure can then be used by the central control 50 to determine whether PTM communication or PTP communication will be used by one or more of the cells.

An example of an appropriate streamlined counting procedure that might be followed in the first stage is described in U.S. patent application Ser. No. 11/737,977, filed on Apr. 20, 2007, inventor Zhijun Cai, entitled "Polling Method and Apparatus for Long Term Evolution Multimedia Broadcast Multicast Services," which is incorporated herein by reference for all purposes. However, other streamlined counting procedures might be used. It may be instructive to summarize herein an exemplary counting procedure, such as that disclosed in the referenced patent application. Cell B 20 will be used as an example for that purpose.

When an MBMS is to be offered in cell B 20, the ENB 45b in that cell may issue a polling request to the UEs 100 within cell B 20 in order to determine whether or not any of those UEs 100 are interested in receiving the MBMS. The polling request may include an indication of the MBMS available at the ENB 45b. When the ENB 45b issues the polling request, it may be detrimental if all of the UEs 100 interested in the MBMS respond to the polling request. For example, cell B 20 may have 10,000 UEs 100 and each of the UEs 100 may be interested in receiving the MBMS. A response to a polling request by all 10,000 of the UEs 100 might overwhelm the cell B 20.

In order to mitigate the possibility of too many UEs 100 responding to a polling request, a probability factor may be associated with the polling request. For example, a polling factor of 0.001 may be associated with the polling request such that around one in a thousand of the UEs 100 within cell B 20 responds to the polling request. In an embodiment, the polling factor may be communicated along with the polling request to the UEs 100. If one of the UEs 100 is interested in the MBMS identified in the polling request, then the UE 100 may utilize the polling factor in order to determine whether or not to respond to the polling request.

Following the example above with cell B 20 having 10,000 UEs 100 interested in the MBMS, a polling factor of 0.001 may reduce the expected response from a polling request to around ten of the UEs 100. On the other hand, if there are only ten UEs 100 within cell B 20 that are interested in the MBMS, a probability factor of 0.001 may not result in any of the UEs 100 responding to the polling request.

In the event the ENB 45*b* does not receive any responses from the UEs 100 with a small probability factor, such as a probability factor of 0.001, then the probability factor may be incrementally increased until either at least one of the UEs 100 responds to the polling request or the probability factor is 1. Instead of incrementally changing the probability factor and re-polling to obtain an accurate count of interested UEs 100, upon any of the UEs 100 responding to the polling request, the cell may begin a broadcast PTM communication of the MBMS associated with the polling request. The ENB 45*b* may then transmit a stop counting command to the UEs 100 to inform the UEs 100 to no longer respond to the polling request. With a probability factor of 1, if any of the UEs 100 within cell B 20 are interested in the MBMS associated with the polling request, then the UEs 100 will respond to the polling request. If none of the UEs 100 respond to the polling request with a probability factor of 1, then there are no UEs 100 within cell B 20 that are interested in the MBMS associated with the polling request.

In summary, this streamlined counting procedure specifies that the counting of the UEs 100 in a cell that are interested in an MBMS should stop as soon as the ENB 45 for the cell receives at least one response from an interested UE 100. By contrast, the R6 counting algorithm mentioned above specifies that all responses from interested UEs 100 are to be counted.

In an embodiment, this streamlined counting procedure is used in the first stage of a multi-stage procedure. In the first stage, a count is made by a number of cells in a region that contain UEs that may be interested in receiving an MBMS. That is, a central control that controls a plurality of cells might send each cell an instruction to perform the streamlined counting procedure. Each ENB that receives a response from a UE might return to the central control a message stating that at least one UE interested in the MBMS is present in the cell associated with the ENB. The central control might then maintain a count of the number of cells from which it has received such responses.

In an embodiment, when the number of cells that contain UEs that are interested in receiving the MBMS is above a relatively low threshold, for example, 1, the central control specifies that the MBMS should be broadcast using PTM communication. In one embodiment, the MBMS is broadcast via PTM communication only in the cells containing interested UEs. In another embodiment, the MBMS is broadcast via PTM communication to all of the cells under the control of the central control. This can cause an SFN to be formed over one or more of the cells or over the entire region controlled by the central control and can improve the quality of the MBMS signal in that region. In either case, no further counting of the number of interested UEs is done and a second stage of the multi-stage procedure is not entered.

When the number of cells that contain UEs interested in receiving the MBMS is below the threshold, for example, 1, the second stage of the multi-stage procedure can be entered. In the second stage, a more detailed counting procedure, such as the R6 counting algorithm, is used in the cells that have interested UEs to determine a more accurate count of the number of interested UEs in each of those cells. Since the detailed counting procedure is used only when the number of cells with interested UEs is relatively low, the communication overhead and the load on uplink access channels can be decreased compared to previous scenarios where the detailed counting procedure might have been used for a large number of cells.

In an embodiment, the results of the more accurate counting are used to determine the type of communication that will be used in the cells in which the counting was done. When the number of interested UEs in a cell is small, PTP communication or other enhancements might be used in that cell. When the number of interested UEs in a cell is large, PTM communication might be used in that cell. That is, a second threshold might be designated in the second stage of the multi-stage procedure, for example, 7. When the number of interested UEs in a cell is below the second threshold, PTP communication is used in that cell and when the number of interested UEs in a cell is above the second threshold, PTM communication is used in that cell. Different cells might use different types of communication depending on the number of UEs in each of the cells.

In an embodiment, this multi-stage procedure is used when an MBMS is initially offered to determine the types of communication that will be used for the MBMS. Thereafter, the central control might employ a dynamic procedure to monitor and/or modify the communication types as interested UEs enter and exit the cells or interested UEs may leave or join the service reception in which the MBMS is offered. The central control might keep track of the communication types currently in use and the number of interested UEs entering and exiting the cells (or interested UEs may leave or join the service reception) and might make appropriate adjustments to the communication types based on that information. For example, the multi-stage procedure might initially determine that a large number of UEs interested in a particular MBMS are present in a cell and that PTM communication should therefore be used for the MBMS in that cell. If a large portion of the interested UEs were then to leave the cell, the central control might convert to PTP communication for the remaining interested UEs. Similarly, if a cell that was initially using PTP communication for an MBMS gained a large number of UEs interested in the MBMS, the central control might instruct that cell to convert to PTM communication for the MBMS.

As mentioned previously, a threshold number of cells might be used to determine whether the second stage of the multi-stage procedure is entered. That is, when the number of cells with UEs interested in an MBMS is above the threshold, PTM communication is used for the MBMS and the second stage is not entered. When the number of cells with interested UEs is below the threshold, the second stage is entered and a more accurate count of interested UEs is made to determine whether PTM or PTP communication should be used for the MBMS. In an embodiment, the threshold is a fixed, relatively low number such as two or three or four. In an alternative embodiment, the threshold is still relatively low but is dynamic. That is, the threshold might change over time based on broadcast overhead, power considerations, or other factors. The central control might contain instructions for dynamically determining an appropriate threshold.

Figure 2:
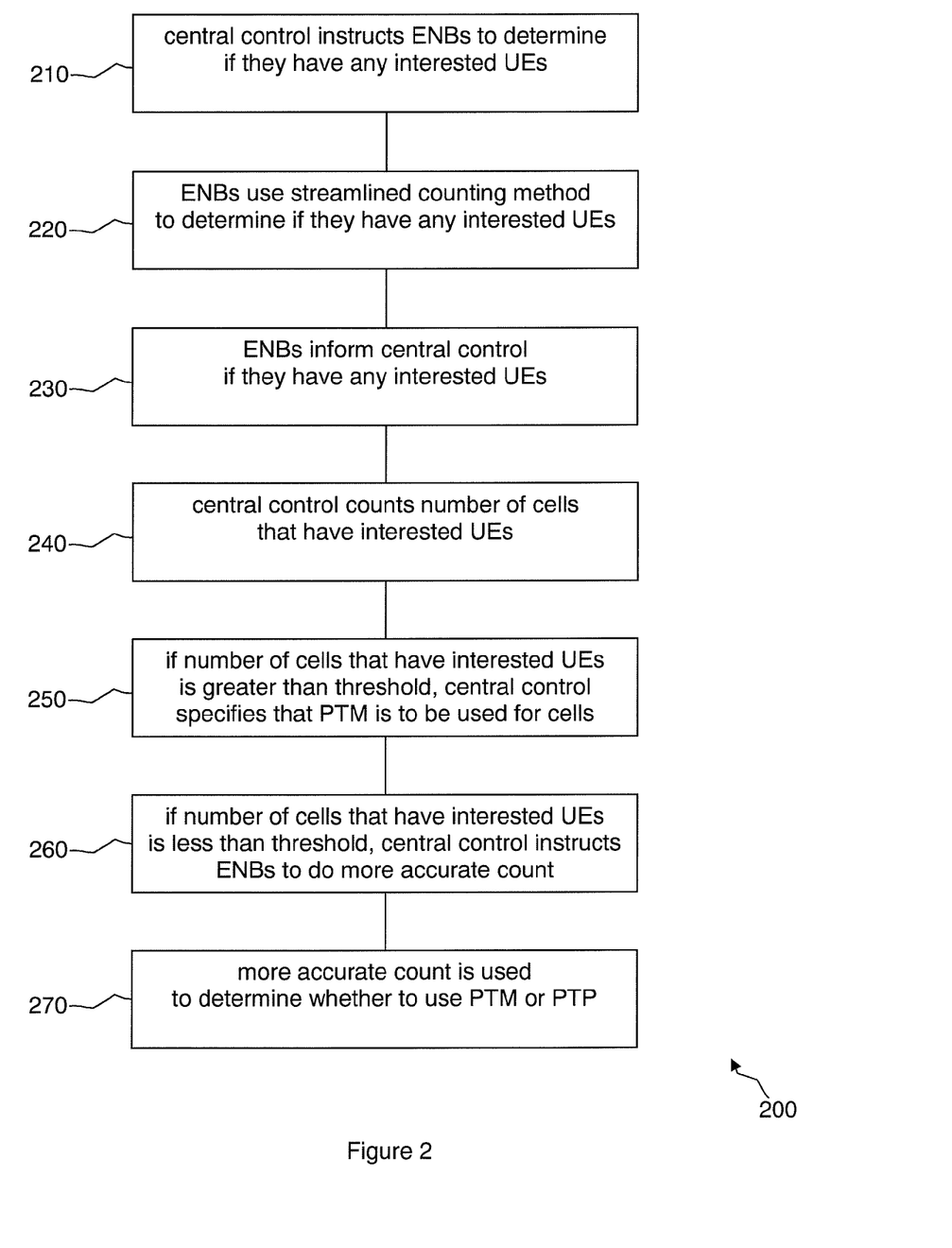
FIG. 2 is a diagram of a method for determining a type of communication for a service according to an embodiment of the disclosure.

FIG. 2 illustrates an embodiment of a method 200 for determining a type of communication for an MBMS in a wireless telecommunications cell. In block 210, a central control instructs a plurality of ENBs to determine if any UEs that are interested in a specified MBMS are present in the cells associated with the ENBs. In block 220, the ENBs use a streamlined counting procedure to determine if at least one interested UE is present in their respective cells. In block 230, each ENB that discovers an interested UE informs the central control that at least one interested UE is present in its associated cell. In block 240, the central control maintains a count of the number of cells that have an interested UE.

In block 250, if the number of cells that have an interested UE is greater than a threshold, the central control specifies that PTM communication is to be used to transmit the MBMS within the cells that have an interested UE. In one embodiment, the MBMS is transmitted only in the cells that have an interested UE and is not transmitted in cells that do not have an interested UE. In another embodiment, the MBMS is broadcast via PTM communication to some or all cells under the control of the central control, thus forming an SFN over all of those cells.

In block 260, if the number of cells that have at least one interested UE is lower than the threshold, the central control instructs the ENBs in those cells to perform a more accurate count of the number of interested UEs. The more accurate count might use the R6 counting algorithm or a similar counting procedure. In block 270, the results of the more accurate count are used to determine whether to use PTM communication or PTP communication for the MBMS. When the number of interested UEs is relatively low, PTP communication might be used and when the number of interested UEs is relatively high, PTM communication might be used.

Figure 3:
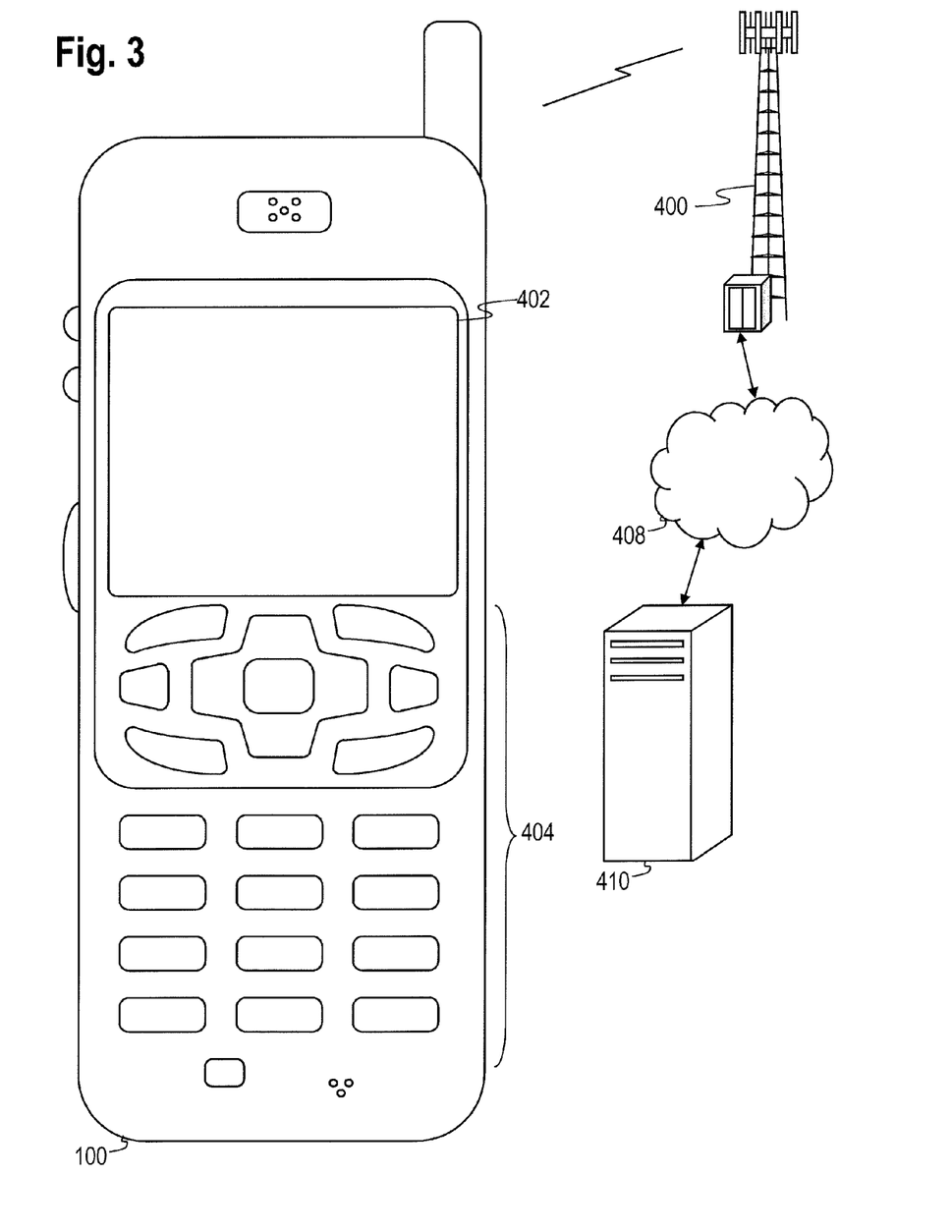
FIG. 3 is a diagram of a wireless communications system including user equipment operable for some of the various embodiments of the disclosure.

FIG. 3 illustrates a wireless communications system including an embodiment of one of the UEs 100. The UE 100 is operable for implementing aspects of the disclosure, but the disclosure should not be limited to these implementations. Though illustrated as a mobile phone, the UE 100 may take various forms including a wireless handset, a pager, a personal digital assistant (PDA), a portable computer, a tablet computer, or a laptop computer. Many suitable devices combine some or all of these functions. In some embodiments of the disclosure, the UE 100 is not a general purpose computing device like a portable, laptop or tablet computer, but rather is a special-purpose communications device such as a mobile phone, wireless handset, pager, or PDA. In another embodiment, the UE 100 may be a portable, laptop or other computing device.

The UE 100 includes a display 402. The UE 100 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 100 may present options for the user to select, controls for the user to actuate, and/or cursors or other indicators for the user to direct. The UE 100 may further accept data entry from the user, including numbers to dial or various parameter values for configuring the operation of the UE 100. The UE 100 may further execute one or more software or firmware applications in response to user commands. These applications may configure the UE 100 to perform various customized functions in response to user interaction.

Among the various applications executable by the UE 100 are a web browser, which enables the display 402 to show a web page. The web page is obtained via wireless communications with a wireless network access node, a cell tower, or any other wireless communication network or system 400. The network 400 is coupled to a wired network 408, such as the Internet. Via the wireless link and the wired network, the UE 100 has access to information on various servers, such as a server 410. The server 410 may provide content that may be shown on the display 402.

Figure 4:
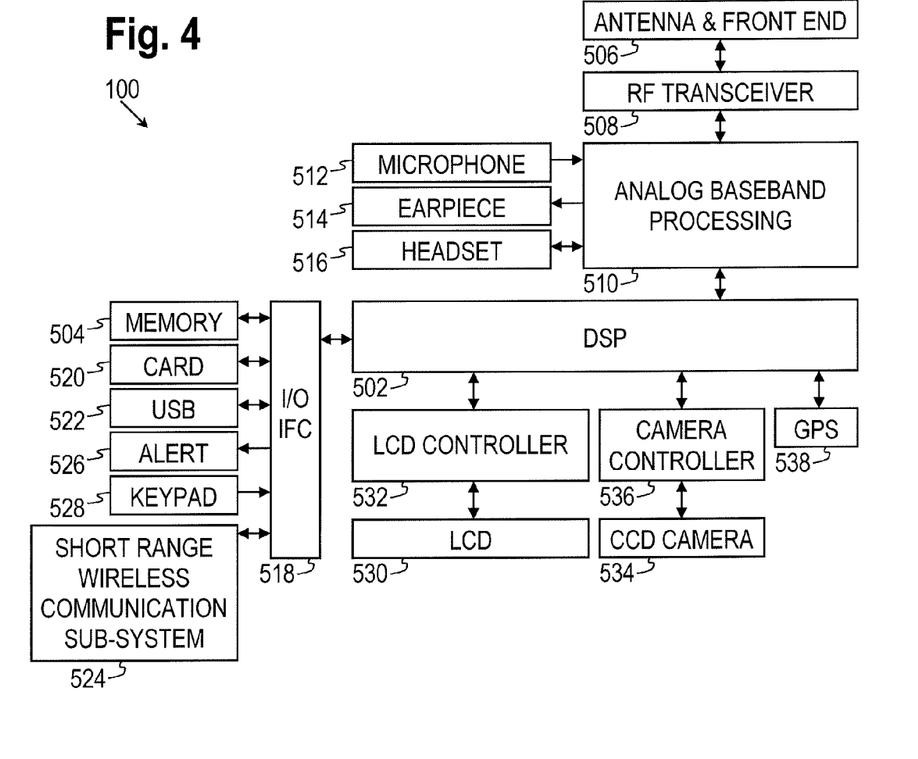
FIG. 4 is a block diagram of user equipment operable for some of the various embodiments of the disclosure.

FIG. 4 shows a block diagram of the UE 100. The UE 100 includes a digital signal processor (DSP) 502 and a memory 504. As shown, the UE 100 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the UE 100 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 100 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the UE 100 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 100 and may also enable the UE 100 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 100 to communicate wirelessly with other nearby mobile devices and/or wireless base stations.

The input/output interface 518 may further connect the DSP 502 to the alert 526 that, when triggered, causes the UE 100 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 100. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 100 to take digital pictures. The DSP 502 communicates with the CCD camera 534 via the camera controller 536. The GPS sensor 538 is coupled to the DSP 502 to decode global positioning system signals, thereby enabling the UE 100 to determine its position. Various other peripherals may also be included to provide additional functions, e.g., radio and television reception.

Figure 5:
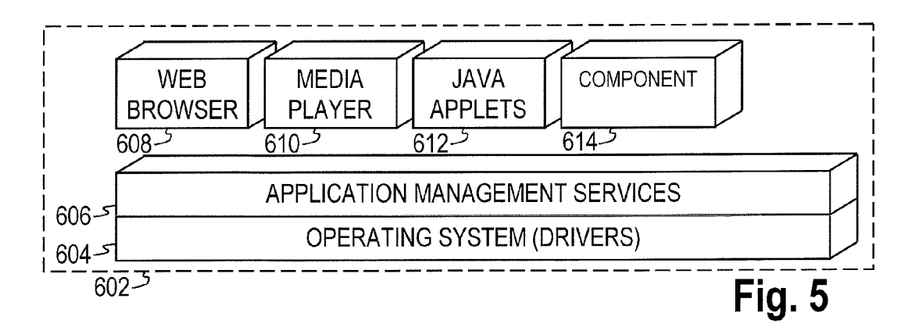
FIG. 5 is a diagram of a software environment that may be implemented on user equipment operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 100. Also shown in FIG. 5 are a web browser application 608, a media player application 610, and Java applets 612. The web browser application 608 configures the UE 100 to operate as a web browser, allowing a user to enter information into forms and select links to retrieve and view web pages. The media player application 610 configures the UE 100 to retrieve and play audio or audiovisual media. The Java applets 612 configure the UE 100 to provide games, utilities, and other functionality. A component 614 might provide functionality related to UE counting or other procedures or processes.

Figure 6:
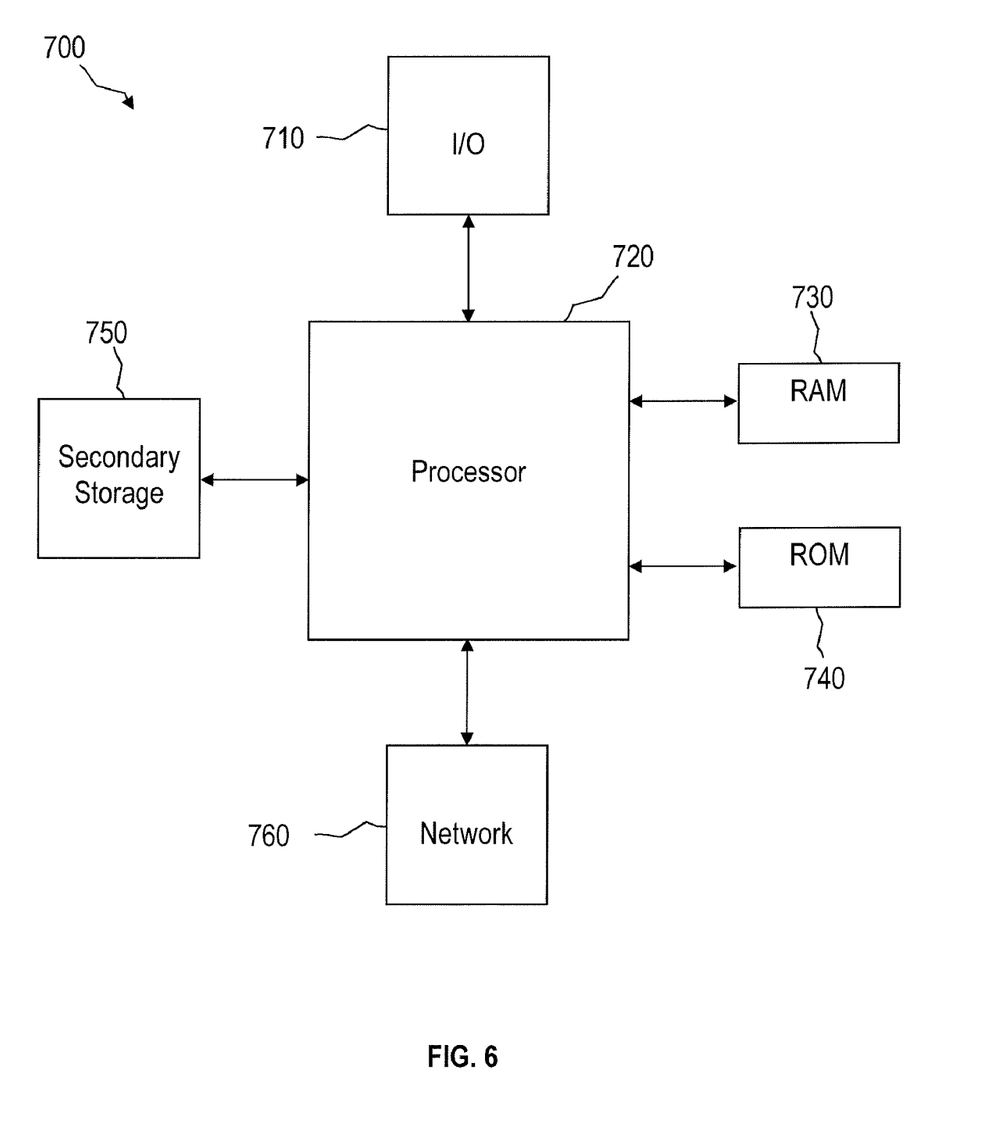
FIG. 6 is an illustrative general purpose computer system suitable for some of the various embodiments of the disclosure.

The ENB 45, the central control 50, and other components that might be associated with the cells 10, 20, 30, and 40 may include any general-purpose computer with sufficient processing power, memory resources, and network throughput capability to handle the necessary workload placed upon it. FIG. 6 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network component, comprising:
   a processor configured to:
   instruct a plurality of cells under control of the network component to use a first counting method to determine whether user equipment within the plurality of cells are interested in a service;
   count a number of cells that respond affirmatively to the determination;
   when the number of cells is above a first threshold, cause the service to be transmitted via point to multipoint (PTM) communication; and
   when the number of cells is below the first threshold; instruct the cells that respond affirmatively to use a second counting method to determine a number of UE's interested in the service,
   wherein when the number of UE's in one of the cells that responds affirmatively is below a second threshold, the service is transmitted via point to point (PTP) communication, and when the number of UE's in one of the cells that responds affirmatively is above the second threshold, the service is transmitted via PTM communication, and
   wherein when the number of UE's in one of the cells that responds affirmatively is above the second threshold, the processor is further configured to instruct all of the plurality of cells under control of the network component to transmit the service via PTM.

2. The network component of claim 1, wherein the first counting method is a streamlined counting method and wherein the second counting method is a comprehensive counting method.

3. The network component of claim 2, wherein the streamlined counting procedure comprises counting less than all of the UEs interested in the service.

4. The network component of claim 1, wherein the first counting method is performed by a counting procedure wherein the cells issue a stop counting command in response to one user equipment indicating an interest in the service.

5. The network component of claim 1, wherein the first threshold can be dynamically modified.

6. A method for providing a service in a wireless communication network, the method comprising:
   instructing, by a central control, a plurality of cells under control of the central control to use a first counting method to determine whether user equipment within the plurality of cells are interested in the service;
   counting, by the central control, a number of cells that respond affirmatively to the determination;
   when the number of cells is above a first threshold, causing, by the central control, the service to be transmitted via point to multipoint (PTM) communication; and
   when the number of cells is below the first threshold; instructing, by the central control, the cells that respond affirmatively to use a second counting method to determine a number of UE's interested in the service,
   when the number of UE's in one of the cells that responds affirmatively is below a second threshold, the service is transmitted via point to point (PTP) communication, and when the number of UE's in one of the cells that responds affirmatively is above the second threshold, the service is transmitted via PTM communication, and
   when the number of UE's in one of the cells that responds affirmatively is above the second threshold, instructing, by the central control, all of the plurality of cells under control of the central control to transmit the service via PTM.

7. The method of claim 6 wherein the first counting method is a streamlined counting method and wherein the second counting method is a comprehensive counting method.

8. The method of claim 6, wherein the first counting method is performed by a counting procedure wherein the cells issue a stop counting command in response to one user equipment indicating an interest in the service.

9. The method of claim 6, wherein the first threshold can be dynamically modified.

* * * * *